(12) United States Patent
Nguy (10) Patent No.: US 7,068,465 B2
(45) Date of Patent: Jun. 27, 2006

(54) MAGNETIC SHIELD FOR THE DRIVE HOUSING OF A RECORDING DRIVE

(75) Inventor: Hai Chi Nguy, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 693 days.

(21) Appl. No.: 09/823,236

(22) Filed: Mar. 30, 2001

(65) Prior Publication Data
US 2002/0141109 A1    Oct. 3, 2002

(51) Int. Cl.
*G11B 33/14* (2006.01)

(52) U.S. Cl. .................................................. 360/97.02

(58) Field of Classification Search ............. 360/97.02, 360/97.03, 97.04
See application file for complete search history.

(56) References Cited

U.S. PATENT DOCUMENTS

| | | | | |
|---|---|---|---|---|
| 5,187,621 A | * | 2/1993 | Tacklind | 360/97.02 |
| 5,477,401 A | * | 12/1995 | Squires et al. | 360/75 |
| 5,510,954 A | * | 4/1996 | Wyler | 361/685 |
| 5,650,895 A | * | 7/1997 | Koizumi et al. | 360/97.03 |
| 5,781,373 A | * | 7/1998 | Larson et al. | 360/97.02 |
| 6,469,864 B1 | * | 10/2002 | Kamezawa et al. | 360/97.01 |
| 6,473,263 B1 | * | 10/2002 | Jang et al. | 360/97.01 |

FOREIGN PATENT DOCUMENTS

| | | | |
|---|---|---|---|
| JP | 06236674 A | * | 8/1994 |
| JP | 10069763 A | * | 3/1998 |

OTHER PUBLICATIONS

Univerisal Enclosure for Personal Computer Peripheral Devices, IBM Technical Disclosure Bulletin, Nov. 1990, Voiume 33, issue 6A, pp. 258-259.*
Jack Wernick, Magnetic Materials, Bulk, Dec. 4, 2000, John Wiley & Sons, Inc.*

* cited by examiner

*Primary Examiner*—David Davis
(74) *Attorney, Agent, or Firm*—James P. Broder; Steven G. Roeder (57) ABSTRACT

A drive housing (22) for shielding a storage disk (13) and a data transducer (48) of a disk drive (10) from external magnetic fields includes a housing shield (24) positioned near the storage disk (13). The housing shield (24) includes a base shield portion (60) and a cover shield portion (64) that are positioned substantially parallel to the storage disk (13). The housing shield (24) also includes one or more wall shield portions (62) oriented substantially perpendicular to the storage disk (13). The housing shield (24) is uniquely sized, shaped and formed from material to have an attenuation of field of at least approximately 10 dB. With this design, the influence of external magnetic fields is reduced and the incidence of damage to data stored on the storage disk (13) is reduced. Additionally, the housing shield (24) enhances the accurate transfer of information between the storage disk (13) and the data transducer (48) of the disk drive (10).

30 Claims, 5 Drawing Sheets

MAGNETIC SHIELD FOR THE DRIVE HOUSING OF A RECORDING DRIVE

FIELD OF THE INVENTION

The present invention relates generally to disk drives for storing data. More specifically, the present invention relates to a housing for a disk drive that reduces the influence of external magnetic fields on the operation of the disk drive.

BACKGROUND

Disk drives are widely used in computers and data processing systems for storing information in digital form. These disk drives commonly use one or more rotating magnetic storage disks to store data. Each storage disk typically includes a data storage surface on each side of the storage disk. These storage surfaces are divided into a plurality of narrow, annular, regions of different radii, commonly referred to as "tracks". Typically, an E-block having one or more actuator arms is used to position a data transducer of a transducer assembly proximate each data storage surface of each storage disk. An actuator motor is used to provide a driving force for moving the E-block relative to the storage disks.

Most disk drives are longitudinal recording drives. A longitudinal recording drive records data longitudinally in the tracks of the storage disks. Recently, however, attempts have been made to develop perpendicular recording drives. In contrast to longitudinal recording drives, perpendicular recording drives record data perpendicular to the disk surface of the storage disk. It is anticipated that perpendicular recording drives can more densely record data than longitudinal recording drives. Moreover, perpendicular recording drives are expected to be more thermally stable than longitudinal recording drives.

Typically, during operation of the disk drive, the distance between the data transducer and the storage surface is extremely small, i.e. on the order of microns or less. Accordingly, in order to avoid data transfer errors, the data transducer must be accurately positioned relative to the storage surface. Because of the need for precise positioning of the data transducers relative to the data storage surfaces, and because the storage disks are often magnetic in nature, any extraneous magnetic fields can adversely impact the ability of the disk drive to precisely and accurately read data from the storage disks, and write information to the storage disks. This effect is particularly apparent when the external magnetic field is "vertical", i.e. perpendicular to the storage surface of the storage disk, or "circumferential", i.e. substantially parallel to the storage disks and substantially perpendicular to a line drawn from the center of a disk spindle to the data transducer.

One indication of the incidence of error in the transfer of data between the data transducer and the storage disk is known as the "Bit Error Rate". The term "Bit Rate Error" refers to a number of errors divided by the number of bit transfers. Typically, as the external magnetic field around the disk drive increases, the "Bit Error Rate" of the disk drive increases. Thus, as the Bit Error Rate rises, a higher percentage of inaccuracies occur during operation of the disk drive.

External magnetic fields can influence both longitudinal recording drives and perpendicular recording drives. For example, external magnetic forces can cause transition shifts in perpendicular recording drives. Transition shifts are slight, yet significant timing deviations in the operation of a disk drive. These transition shifts are highly problematic in magnetic storage devices because they alter the ability of the disk drive to accurately and efficiently transfer data to and from the storage disk.

Moreover, the accurate and stable positioning of each transducer assembly near each data storage surface is critical to the transfer and retrieval of information from the magnetic storage disks. External magnetic fields may cause errors in data transfers due to even slight inaccuracies in the positioning of the data transducers during disk drive operation.

In light of the above, a need exists to provide a disk drive that accurately and precisely transfers data to and from a data storage surface of a magnetic storage disk. In addition, there is a need to decrease or inhibit external magnetic forces from negatively influencing operation of the disk drive. Further, the need exists to provide a magnetically stable environment for the disk drive and the internal components of the disk drive. Yet another need exists to provide a disk drive that is not influenced by external magnetic fields, which is relatively easy and inexpensive to manufacture.

SUMMARY

The present invention is directed to a drive housing which satisfies these needs, and a method for shielding a storage disk and a data transducer of a disk drive from external magnetic fields. The drive housing includes a housing shield positioned near the storage disk of the disk drive. The housing shield is uniquely sized, shaped and formed from specific material to have an attenuation of field of at least approximately 10 dB. In so doing, the housing shield attenuates the external magnetic fields. Accordingly, the incidence of damage to the data stored on the storage disk, and/or the incidence of inaccurate data transfers of information between the data transducer and the storage disk is decreased.

Depending on the design of the disk drive, the housing shield can include a base shield portion and a cover shield portion positioned substantially parallel to the disk surface of the magnetic storage disk. In this embodiment, the cover shield portion is positioned so that the storage disk is substantially between the cover shield portion and the base shield portion, thereby shielding the storage disk from external magnetic fields. In particular, because of the parallel orientation of base shield portion and the cover shield portion to the storage disk, the housing shield is particularly effective in shielding external magnetic fields that are perpendicular to the storage disk.

Preferably, the housing shield further includes one or more wall shield portions that secure the cover shield portion to the base shield portion. Typically, the wall shield portions are positioned substantially perpendicular to the storage surface of the storage disk. The unique presence and positioning of the housing shield attenuates external magnetic fields directed towards the drive housing from a circumferential direction.

The housing shield is preferably made from a material that has a relative permeability of at least approximately 50,000 and even more preferably at least approximately 100,000. Suitable materials for the housing shield include a metal alloy having both nickel and iron (known as a Ni—Fe alloy). Further, the thickness of the housing shield can vary according to the type of the material utilized. When formed at a thickness of greater than approximately 0.20 millimeters, and preferably greater than 0.30 millimeters, the housing shield is particularly effective at shielding the magnetic components of the disk drive that are positioned inside the disk housing from external magnetic fields.

The present invention is also directed to a method for shielding a storage disk and a data transducer of a disk drive from external magnetic fields. The method includes the steps of providing a magnetic storage disk and enclosing the storage disk in a drive housing having a housing shield with an attenuation of field of at least 10 dB.

Importantly, because of the magnetically stable environment provided by the housing shield, the disk drive can more accurately and precisely transfer data to and from the storage disk. In addition, the present invention shields the disk drive from external magnetic fields without adding significantly to the cost and expense of manufacturing the disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
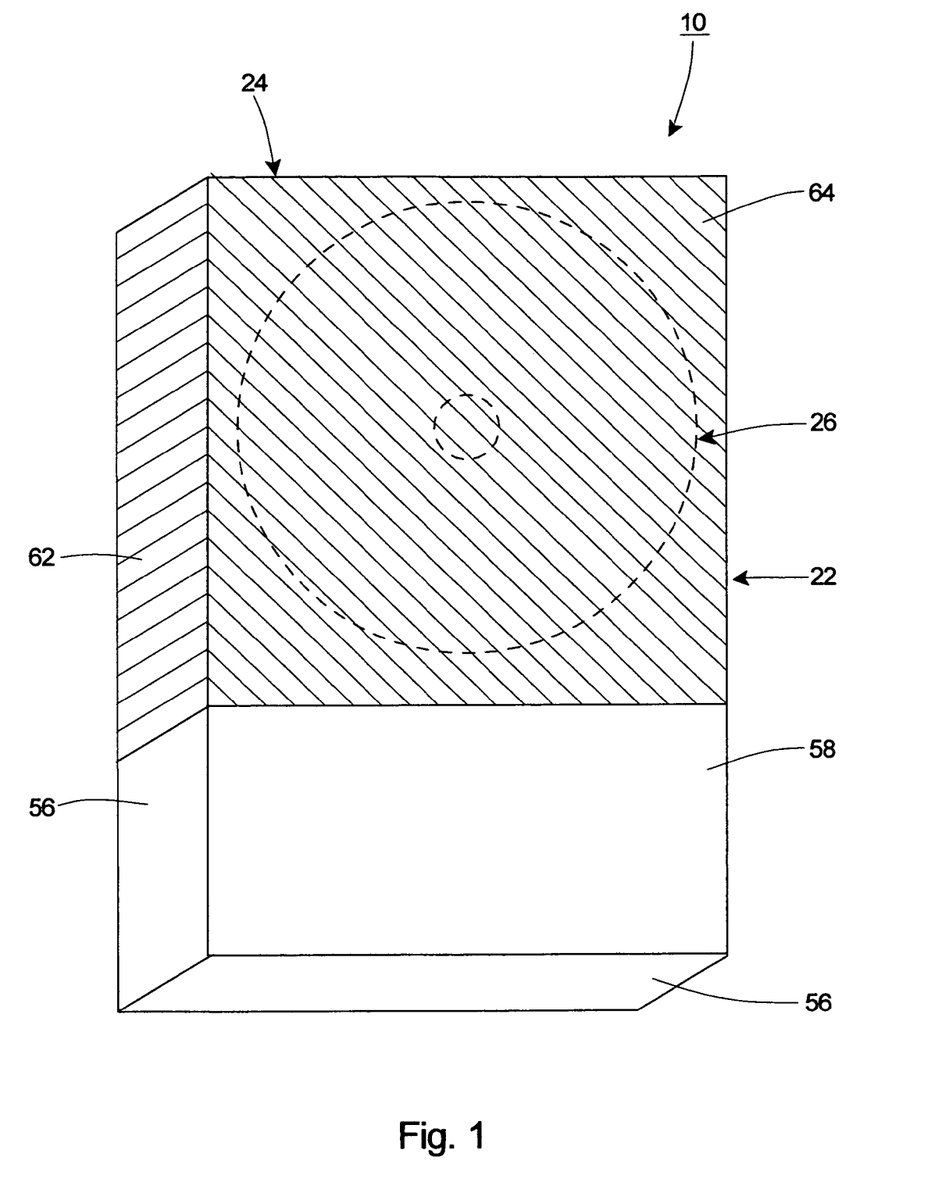
FIG. 1 is a simplified illustrative view of a disk drive having features of the present invention.
Figure 2A:
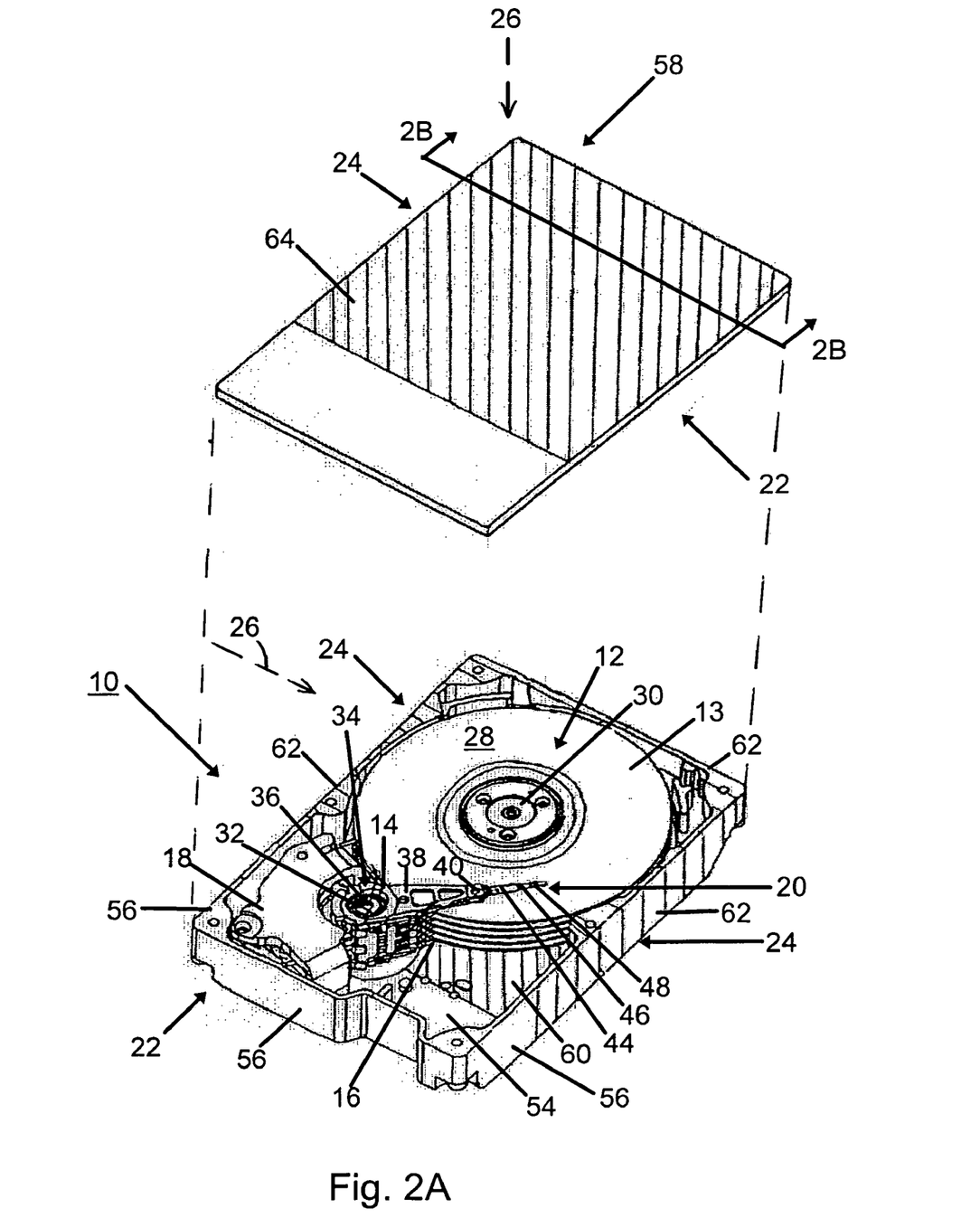
FIG. 2A is a partially exploded view of the disk drive having features of the present invention.

Referring initially to FIGS. 1 and 2A, a disk drive 10 according to the present invention includes (i) a disk assembly 12 including one or more storage disks 13, (ii) an E-block 14 having one or more actuator arms 16, (iii) an actuator motor 18, (iv) one or more transducer assemblies 20, and (v) a drive housing 22. As provided below, the drive housing 22 includes a housing shield 24 that shields the internal components of the disk drive from external magnetic fields 26 (illustrated as dashed arrows in FIG. 2A) from reaching the disk assembly 12 and the transducer assemblies 20. In this manner, the housing shield 24 inhibits external magnetic fields 26 from adversely impacting accurate and precise data transfers between the transducer assemblies 20 and the disk assembly 12. Further, the housing shield 24 protects data stored on the storage disks 13 from alteration due to stray magnetic forces 26 imparted on the disk drive 10 from external sources.

A detailed description of the various components of a disk drive is provided in U.S. Pat. No. 5,208,712, issued to Hatch et al. The contents of U.S. Pat. No. 5,208,712 are incorporated herein by reference.

The disk assembly 12 includes the storage disks 13 that store data in a form that can be subsequently retrieved if necessary. Magnetic storage disks 13 are commonly used to store data in digital form. Alternately, for example, each storage disk 13 can be optical or magneto-optical. For conservation of space, each storage disk 13 preferably includes a storage surface 28 on each side of the storage disk. These storage surfaces 28 are typically divided into a plurality of narrow annular regions (not shown) of different radii, commonly referred to as "tracks." The storage disks 13 are manufactured by ways known to those skilled in the art.

Currently, most disk drives 10 are longitudinal recording drives. As explained previously, a longitudinal recording drive records data longitudinally in the tracks of the storage disks 13. Recently, perpendicular recording drives, which record data perpendicular to the storage surface 28 of the storage disk 13 are being developed. Although the present invention can be utilized with both longitudinal and perpendicular recording drives, use of the housing shield 24 is particularly useful for perpendicular recording disk drives 10.

Depending upon the design of the disk drive 10, any number of storage disks 13 can be used with the disk drive 10. For example, the disk drive 10 can include one (1), two (2), three (3), six (6), nine (9), or twelve (12) storage disks 13. For two-sided storage disks 13, the storage disks 13 are spaced apart a sufficient distance so that at least one (1) transducer assembly 20 can be positioned proximate each of the storage surfaces 28 of adjacent storage disks 13. To conserve space, a centerline (not shown) of consecutive storage disks 13 is typically spaced apart between about one millimeter (1.0 mm) to three millimeters (3.0 mm).

The storage disks 13 are spaced apart on a disk spindle 30 that is mounted to a spindle shaft (not shown) which is secured to the drive housing 22. The disk spindle 30 rotates on a disk axis (not shown) relative to the spindle shaft on a spindle bearing assembly (not shown). Typically, the disk spindle 30 and the storage disks 13 are rotated about the disk axis at a predetermined angular velocity by a spindle motor (not shown).

The rotation rate of the storage disks 13 varies according to the design of the disk drive 10. Presently, disk drives 10 utilize storage disks 13 rotated at an angular velocity of between about 4,500 RPM to 10,000 RPM. It is anticipated that technological advances will allow for disk drives 10 having storage disks 13 which rotate at higher speeds, such as about 15,000 or more RPM.

The E-block 14 retains and positions the transducer assemblies 20 proximate the appropriate track on the storage disk 13. The design of the E-block 14 can vary. As can best be seen with reference to FIG. 2A, the E-block 14 includes an actuator hub 32 and a plurality of parallel actuator arms 16 that are attached to and cantilever from the actuator hub 32. In the embodiment illustrated in FIG. 2A, the actuator hub 32 is substantially tubular and is mounted to an actuator shaft 34. The actuator shaft 34 is secured to the drive housing 22. The actuator hub 32 rotates on a hub axis 36 relative to the actuator shaft 34 on an actuator bearing assembly (not shown).

The actuator arms 16 move with the actuator hub 32 and position the transducer assemblies 20 between the storage disks 13, proximate the storage surfaces 28. Each actuator arm 16 includes a proximal section 38 that is secured to the actuator hub 32 and a distal section 40 that cantilevers away from the actuator hub 32. The spacing of the actuator arms 16 varies according to the spacing of the storage disks 13. The distance between consecutive actuator arms 16 is typically between about one millimeter (1 mm) to three millimeters (3 mm).

The actuator motor 18 can be implemented in a number of alternate ways known by those skilled in the art. For example, the actuator motor 18 can be a rotary voice coil actuator or a linear voice coil actuator. In the embodiment shown in FIG. 2A, the actuator motor 18 is a rotary voice coil actuator. In this embodiment, activation of the actuator motor 18 rotates the E-block 14 and precisely moves the transducer assemblies 20 relative to the storage disks 13.

The actuator motor 18 includes a coil that is attached to the E-block 14. The coil is disposed between a pair of spaced apart permanent magnets and a pair of spaced apart flux return plates that are secured to the drive housing 22.

The magnets have pole faces of opposite polarity directly facing opposite legs of the coil. The resultant magnetic fields are such that current passing through the coil in one (1) direction causes rotation of the E-block 14 in one (1) radial direction relative to the disk assembly 12, while reverse current causes reverse direction movement. Thus, the actuator motor 18 is able to bi-directionally rotate the E-block 14 relative to the drive housing 22.

The transducer assemblies 20 transfer or transmit information between the computer (not shown) or word processor (not shown) and the storage disks 13. Referring to FIG. 2A, each transducer assembly 20 includes a load beam 44, a baseplate (not shown) securing the load beam 44 to the actuator arm 16, a flexure 46, and a data transducer 48. The load beam 44 attaches the flexure 46 and the data transducer 48 to the E-block 14. Typically, each load beam 44 is flexible in a direction perpendicular to the storage disk 13 and acts as a spring for supporting the data transducer 48.

Each flexure 46 is used to attach one (1) of the data transducers 48 to one (1) of the load beams 44. Typically, each flexure 46 includes a plurality of conductive flexure traces (not shown) that electrically connect the data transducer 48 to drive circuitry (not shown) of the disk drive 10.

Each data transducer 48 interacts with one (1) of the storage disks 13 to access or transfer information to the storage disk 13. For a magnetic storage disk 13, the data transducer 48 is commonly referred to as a read/write head.

Figure 2B:
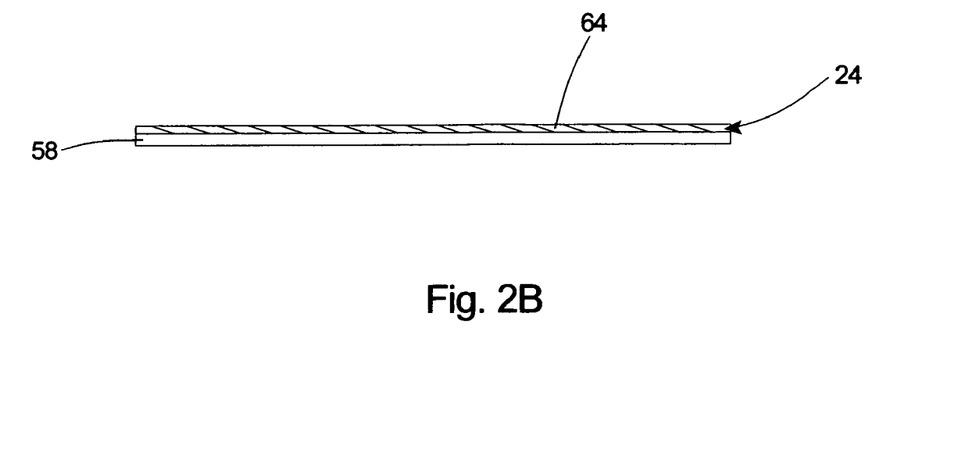
FIG. 2B is a cross-sectional view taken on line 2B—2B in FIG. 2A.

The drive housing 22 retains and encloses the various components of the disk drive 10. Referring to FIGS. 1, 2A and 2B, the drive housing 22 includes the housing shield 24 that shields the storage disks 13 and the data transducers 48 from external magnetic fields. The drive housing 22 can vary in size and shape. Typically, the drive housing 22 includes a housing base 54 and four (4) housing walls 56. The walls 56 form a generally rectangular shaped frame that is secured to the housing base 54. The walls 56 extend substantially perpendicularly upward from the housing base 54. Alternately, different configurations involving greater or fewer than four housing walls 56 are possible. Further, the drive housing 22 also includes a housing cover 58 (shown in FIGS. 1, 2A and 2B) that is spaced apart from the housing base 54 by the housing walls 56. The drive housing 22 is typically formed from aluminum or other metals, although other suitable materials can be used.

The design of the housing shield 24 can be varied to suit the design requirements of the disk drive 10 and the environment surrounding the disk drive 10. Preferably, the housing shield 24 shields the storage disks 13 from external magnetic fields that are applied in a substantially perpendicular direction relative to the data storage surface 28 of the storage disks 13. Further, the housing shield 24 also shields the storage disks 13 from external magnetic fields that are applied in a circumferential direction, i.e. substantially parallel to the storage disks 13 and substantially perpendicular to a line drawn from the disk spindle 30 to the data transducer 48 (See FIG. 2A).

FIGS. 1 and 2A illustrate one embodiment of the housing shield 24 and the positioning of the housing shield 24 (shown in shading) relative to one or more storage disks 13. In this embodiment, the housing shield 24 includes a base shield portion 60, one or more wall shield portions 62 and a cover shield portion 64. In this manner, a high level of attenuation of the external magnetic fields is achieved by having a continuous housing shield 24 to allow for the magnetic field to be shielded around the drive housing 22. Alternately, for example, the housing shield 24 can include only one or more of the following: the base shield portion 60, the wall shield portions 62 and/or the cover shield portion 64. A non-continuous housing shield 24 can effectively shield the internal components of the disk drive 10 provided the gaps between the portions of the housing shield 24 are relatively small.

As provided in FIGS. 2A and 2B for example, the housing base 54, the housing walls 56 and the housing cover 58 can be formed similar to a regular drive housing 22 and the housing shield 24 can be a layer of material having a shield thickness that is secured to the desired locations along the drive housing 22. Alternately, as illustrated in the Figures, the housing shield 24 can be integrally formed into the drive housing 22 so that the shield thickness of the housing shield 24 substantially equals the thickness of the drive housing 22. As provided above, the portion of the drive housing 22 that does not comprise the housing shield 24 is typically formed from aluminum or other metals.

The housing base 54 includes the base shield portion 60 that comprises at least a portion of the housing shield 24. The base shield portion 60 is preferably positioned adjacent to the storage disks 13 such that superimposition of the base shield portion 60 onto the storage disks 13 entirely covers the storage disks 13. Although only a portion of the housing base 54 needs to be formed with the relatively high magnetically permeable materials described below, the entire housing base 54 can be constructed from such relatively high magnetically permeable materials. Additionally, the base shield portion 60 can include the entire thickness of the housing base 54, or can alternatively be a layer of the housing base 54.

The housing walls 56 are also typically perpendicular to the data storage surfaces 28 of the storage disks 13. Each housing wall 56 can include the wall shield portion 62 that is preferably positioned adjacent to the storage disks 13 as illustrated in FIGS. 1 and 2A. However, the wall shield portion 62 can comprise one or more entire housing walls 56. Alternatively, the wall shield portion 62 can comprise only a portion of one or more of the housing walls 56. The wall shield portion 62 of each housing wall 56 shields the storage disks 13 from external magnetic fields that are applied in the circumferential direction. Moreover, the wall shield portion 62 can include the entire thickness of one or more of the housing walls 56, or can alternatively be a layer of one or more of the housing walls 56.

The housing cover 58 is normally secured to one or more of the housing walls 56. The housing cover 58 is typically positioned parallel to the data storage surfaces 28 of the storage disks 13. The housing cover 58 is usually located adjacent the storage disks 13 opposite the housing base 54, so that the storage disks 13 are positioned between the housing base 54 and the housing cover 58. As illustrated in FIG. 2B for example, the housing cover 58 preferably includes a cover shield portion 64 that comprises at least a portion of the housing shield 24. The cover shield portion 64 is preferably positioned adjacent to the storage disks 13 such that superimposition of the cover shield portion 64 onto the storage disks 13 entirely covers the storage disks 13, as illustrated in FIGS. 1 and 2A. Although only a portion of the housing cover 58 needs to be formed from the relatively high magnetically permeable materials described below, the entire housing cover 58 can be constructed from such relatively permeable materials.

The housing shield 24 is preferably formed from materials that have a high relative permeability. For instance, various alloy metals possess permeability characteristics that are suitable for this purpose. Typically, the housing shield 24 has a relative permeability of greater than approximately $\mu_r$=50,000. Preferably, the relative permeability of the housing shield 24 exceeds approximately $\mu_r$=75,000. More preferably, the relative permeability of the housing shield 24 is at least approximately $\mu_r$=100,000. Suitable materials for the housing shield 24 include a Ni—Fe alloy. Many Ni—Fe alloys have high relative permeabilities, and are appropriate for use in the present invention. One example of such an alloy has a chemical composition of 75 Ni, 18 Fe, 5 Cu, 2 Cr, with a relative permeability of approximately $\mu_r$=100,000. However, any other suitable material satisfying these permeability criteria can be used for the housing shield 24.

The thickness of the housing shield 24 can vary depending on the relative permeability of the material used for the housing shield 24, and the level of shielding desired. Preferably, the thickness of the housing shield 24 is greater than approximately 0.20 millimeters. More preferably, the thickness is greater than approximately 0.30 millimeters. Most preferably, the thickness is at least approximately 0.35 millimeters. However, the housing shield 24 can be constructed with any material with a combination of relative permeability and thickness which provides a requisite attenuation of field, as will be explained below.

By using a material with a relatively high permeability, the unwanted external magnetic field is better shielded with the housing shield 24. The external magnetic field follows a path of least resistance. Rather than penetrate through the housing shield 24 and influence the magnetic storage disk 13 and the data transducer 48, the external magnetic field is shielded by the housing shield 24. The high relative permeability of the housing shield 24 generates a relatively high "attenuation of field", which allows a greater ability to reduce the impact of the unwanted external magnetic field. Attenuation of field is calculated as follows:

$$A = \mu_r t/d$$

where A is the attenuation of field, $\mu_r$ is the relative permeability, t is the thickness (in millimeters) of the housing shield, and d is the diameter (in millimeters) of the storage disks 13 in the disk drive 10. A greater relative permeability provides a greater attenuation of field. Similarly, a greater thickness of the housing shield 24 generates a higher attenuation of field.

As an example, if $\mu_r$=100,000, the width of the drive housing 22 is 3.5 inches (approximately 101.6 millimeters), and the thickness of the housing shield 24 is 0.3556 millimeters, the attenuation of field is calculated as follows:

$$A(3.5") = 100,000 \times 0.3556/101.6 = 350$$

The attenuation of field is converted to decibels by the following formula:

$$dB = 20(\log_{10} A); \text{ therefore:}$$

$$20 \times (\log_{10} 350) = 50.88 \text{ dB}.$$

Thus, the relative permeability and the thickness of the housing shield 24 can vary. Preferably, the attenuation of field of the housing shield 24 is greater than approximately 10 dB. More preferably, the attenuation of field is greater than approximately 25 dB. Most preferably, the attenuation of field is greater than approximately 50 dB.

Figure 3:
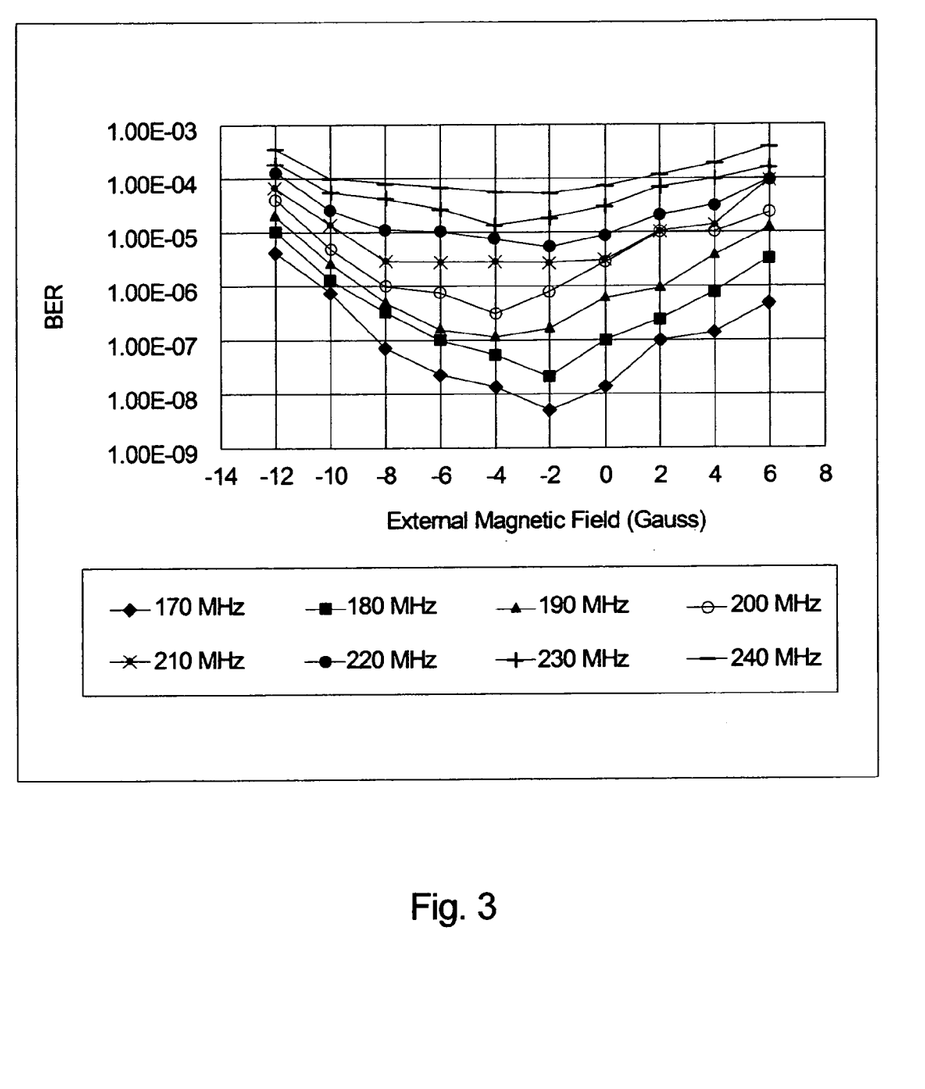
FIG. 3 is a graphical representation showing the influence of external magnetic field on the Bit Error Rate of a disk drive.

FIG. 3 graphically illustrates the influence of external magnetic fields on the Bit Error Rate of the perpendicular recording drive. In general, as the external magnetic field increases, the Bit Error Rate dramatically increases. As shown on FIG. 3, the Bit Error Rate can be adversely impacted by as much as three orders of magnitude, or 1,000 times, due to external magnetic fields. For example, for a 170 MHz frequency, the Bit Error Rate increased from between $10^{-8}$ to $10^{-9}$, to between $10^{-5}$ to $10^{-6}$ when increasing the magnetic field from −2 Gauss to −12 Gauss. Thus, unwanted external magnetic fields can cause approximately 1,000 times more read and write errors during operation of the perpendicular recording drive.

Figure 4:
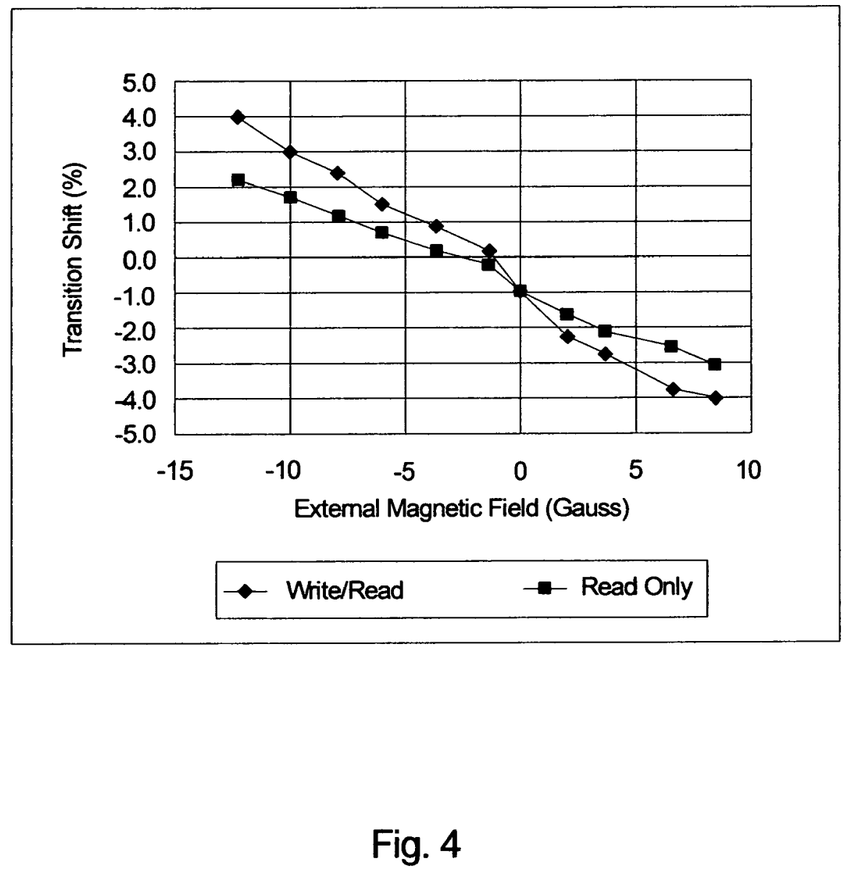
FIG. 4 is a graphical representation showing the influence of external magnetic field on the Perpendicular Recording Transition Shift of a disk drive.

FIG. 4 illustrates the influence of external magnetic fields on the transition shift of the perpendicular recording drive. In general, as the external magnetic field increases, the percentage transition shift increases. As previously provided, the transition shift represents either a delayed or an early response to a specified command from otherwise normal timing absent the external magnetic field. As shown in FIG. 4, a direct relationship exists between the magnitude of the external magnetic field and the percentage transition shift.

Importantly, the housing shield 24 inhibits external magnetic fields 26 from adversely impacting accurate and precise data transfers between the transducer assemblies 20 and the disk assembly 12. Further, the housing shield 24 protects data stored on the storage disks 13 from alteration due to stray magnetic forces 26 imparted on the disk drive 10 from external sources. By attenuating external magnetic fields, greater accuracy and efficiency of the disk drive 10 is attained.

While the particular drive housing 24 and disk drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
   a storage disk having a substantially planar disk surface; and
   a drive housing that retains the storage disk, the drive housing having a housing thickness that is measured in a first direction, the drive housing including a shield portion having a shield thickness measured in the first direction that is substantially similar to the housing thickness, the shield portion being formed from a material having a relative permeability that provides an attenuation of field of at least approximately 25 dB in a direction substantially perpendicular to the disk surface to at least partially shield the storage disk from an external magnetic field.

2. The disk drive of claim 1 wherein the drive housing has an exterior surface and an interior surface, and wherein the shield portion is selectively positioned so that at least part of the exterior surface is devoid of the shield portion.

3. The disk drive of claim 1 wherein the shield portion is substantially formed from material having a relative permeability of at least approximately 50,000.

4. The disk drive of claim 1 wherein the shield portion is substantially formed from material having a relative permeability of at least approximately 100,000.

5. The disk drive of claim 1 wherein the shield portion has a thickness of at least approximately 0.20 millimeters.

6. The disk drive of claim 1 wherein the shield portion is formed substantially from a nickel-iron alloy.

7. The disk drive of claim 1 wherein the shield portion is formed from material that provides an attenuation of field of at least 50 dB that at least partially shields the storage surface from an external magnetic field that is applied in a direction that is substantially perpendicular to the disk surface.

8. The disk drive of claim 1 wherein at least part of the shield portion is positioned substantially parallel to the disk surface, and wherein the part of the shield portion has an area that is at least as great as a surface area of the disk surface.

9. The disk drive of claim 8 wherein the shield thickness of the part of the shield portion times the relative permeability of the part of the shield portion is at least approximately 500 millimeters.

10. The disk drive of claim 1 wherein the disk surface includes a magnetic material.

11. A disk drive comprising:
a storage disk; and
a drive housing that retains the storage disk, the drive housing having a housing thickness, the drive housing including a shield portion that is homogeneously formed with the drive housing substantially through the housing thickness, the shield portion being formed from a material having a relative permeability that provides an attenuation of field of at least approximately 25 dB in a direction substantially perpendicular to the storage disk to at least partially shield the storage disk from an external magnetic field.

12. The disk drive of claim 11 wherein the drive housing has an exterior surface and an interior surface, and wherein the shield portion is selectively positioned so that at least part of the exterior surface is devoid of the shield portion.

13. The disk drive of claim 11 wherein the shield portion is substantially formed from material having a relative permeability of at least approximately 50,000.

14. The disk drive of claim 11 wherein the shield portion is substantially formed from material having a relative permeability of at least approximately 100,000.

15. The disk drive of claim 11 wherein the shield portion has a thickness of at least approximately 0.20 millimeters.

16. The disk drive of claim 11 wherein the shield portion is formed substantially from a nickel-iron alloy.

17. The disk drive of claim 11 wherein the storage disk has a substantially planar disk surface, and wherein the shield portion is formed from material that provides an attenuation of field of at least 50 dB that at least partially shields the disk surface from an external magnetic field that is applied in a direction that is substantially perpendicular to the disk surface.

18. The disk drive of claim 11 wherein the storage disk has a substantially planar disk surface, and wherein at least part of the shield portion is positioned substantially parallel to the disk surface, and wherein the part of the shield portion has an area that is at least as great as a surface area of the disk surface.

19. The disk drive of claim 18 wherein the shield thickness of the part of the shield portion times the relative permeability of the part of the shield portion is at least approximately 500 millimeters.

20. The disk drive of claim 11 wherein the storage disk has a disk surface that includes a magnetic material.

21. A disk drive comprising:
a storage disk; and
a drive housing defining a housing interior that retains the storage disk, the drive housing having an exterior surface and an interior surface, the drive housing including a shield portion that is selectively positioned so that at least part of the exterior surface is devoid of the shield portion, the shield portion being formed from a material having a relative permeability that provides an attenuation of field of at least approximately 25 dB in a direction substantially perpendicular to the storage disk to at least partially shield the storage disk from an external magnetic field.

22. The disk drive of claim 21 wherein the drive housing has a housing thickness that is measured in a first direction at a first location, and wherein the shield portion has a shield thickness measured in the first direction at the first location that is substantially similar to the housing thickness.

23. The disk drive of claim 21 wherein the shield portion is substantially formed from material having a relative permeability of at least approximately 50,000.

24. The disk drive of claim 21 wherein the shield portion is substantially formed from material having a relative permeability of at least approximately 100,000.

25. The disk drive of claim 21 wherein the shield portion has a thickness of at least approximately 0.20 millimeters.

26. The disk drive of claim 21 wherein the shield portion is formed substantially from a nickel-iron alloy.

27. The disk drive of claim 21 wherein the storage disk has a substantially planar disk surface, and wherein the shield portion is formed from material that provides an attenuation of field of at least 50 dB that at least partially shields the disk surface from an external magnetic field that is applied in a direction that is substantially perpendicular to the disk surface.

28. The disk drive of claim 21 wherein the storage disk has a substantially planar disk surface, and wherein at least part of the shield portion is positioned substantially parallel to the disk surface, and wherein the part of the shield portion has an area that is at least as great as a surface area of the disk surface.

29. The disk drive of claim 28 wherein the shield thickness of the part of the shield portion times the relative permeability of the part of the shield portion is at least approximately 500 millimeters.

30. The disk drive of claim 21 wherein the storage disk has a disk surface that includes a magnetic material.

* * * * *